United States Patent
Clem

(10) Patent No.: US 7,594,953 B2
(45) Date of Patent: Sep. 29, 2009

(54) SEPARATING SOLID PARTICLES FROM GAS IN A FLUID BED REACTOR

(75) Inventor: Kenneth R. Clem, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 352 days.

(21) Appl. No.: 11/641,383

(22) Filed: Dec. 19, 2006

(65) Prior Publication Data

US 2007/0175326 A1    Aug. 2, 2007

Related U.S. Application Data

(60) Provisional application No. 60/763,587, filed on Jan. 31, 2006.

(51) Int. Cl.
  *B01D 51/08* (2006.01)
(52) U.S. Cl. .............. 95/29; 96/389; 422/144; 422/147
(58) Field of Classification Search ............ 55/343, 55/345, 346, 349, 385.1; 95/29, 271; 96/389; 208/113; 422/144, 147
See application file for complete search history.

(56) References Cited

U.S. PATENT DOCUMENTS

| | | | |
|---|---|---|---|
| 4,134,825 A * | 1/1979 | Bearden et al. ............. 208/108 |
| 4,220,623 A * | 9/1980 | Jahnke et al. ............... 422/144 |
| 4,251,484 A * | 2/1981 | Daviduk et al. ............. 422/145 |
| 4,295,996 A * | 10/1981 | Bearden et al. ............. 502/183 |
| 4,474,583 A * | 10/1984 | Chen et al. ................. 48/197 R |
| 5,391,289 A * | 2/1995 | Forde et al. ................. 208/113 |
| 5,419,877 A * | 5/1995 | Goforth et al. ............. 422/177 |
| 6,166,282 A | 12/2000 | Miller |
| 6,224,652 B1 | 5/2001 | Caperan et al. |
| 6,749,666 B2 | 6/2004 | Meegan, Jr. |
| 7,309,383 B2 * | 12/2007 | Beech et al. ................... 95/268 |

OTHER PUBLICATIONS

Hoffman, Thomas; Environmental Implication of Acoustic Aerosol Agglomeration; Mar. 27, 2000.*
Primasonics; www/primasonics.com/petrochem_applications.htm; Acoustic Cleaning.*
Shelton, Jake; GE Energy; Powerwave Acoustic Cleaners for SCR Systems; 2004.*

* cited by examiner

*Primary Examiner*—Duane Smith
*Assistant Examiner*—Sonji Turner
(74) *Attorney, Agent, or Firm*—Kevin M. Faulkner; David M. Weisberg

(57) ABSTRACT

This invention is directed to a process for removing catalyst particles from a gas. The invention is particularly suited to separating particles from the gas in a vessel that has a dilute phase zone and a dense phase zone. An acoustic waveform is applied to the dilute phase zone to assist in separating small particles from the gas in the dilute phase zone.

48 Claims, 1 Drawing Sheet

SEPARATING SOLID PARTICLES FROM GAS IN A FLUID BED REACTOR

CROSS-REFERENCE TO RELATED APPLICATIONS

Figure 1:
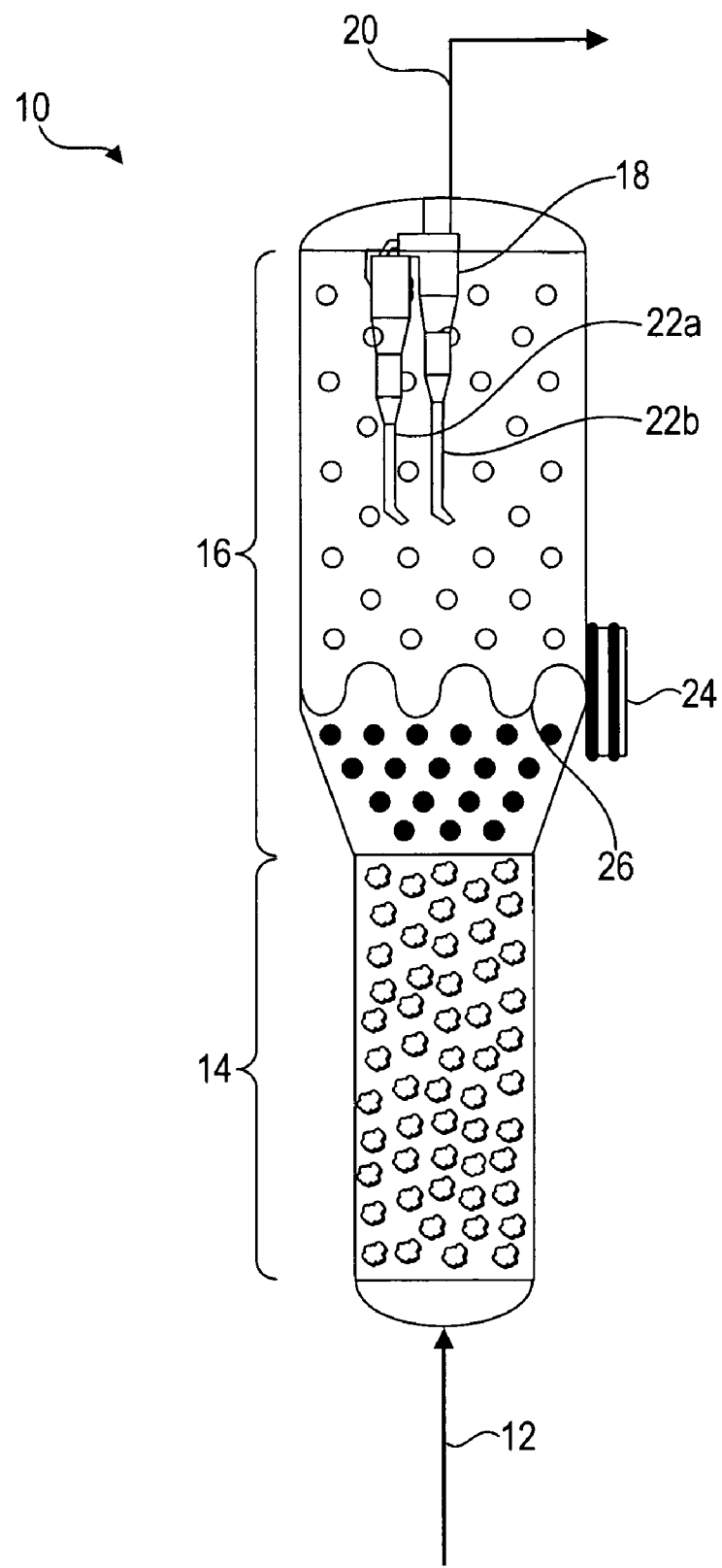

This application claims priority to application Ser. No. 60/763,587, filed Jan. 31, 2006, which is hereby incorporated by reference.

FIELD OF THE INVENTION

This invention relates to a process for removing catalyst particles from a dilute phase zone of a vessel and recovering the catalyst particles in a dense phase zone. In particular, this invention relates to applying an acoustic waveform to the dilute phase zone to agglomerate the catalyst particles in the dilute phase zone and remove the agglomerated particles.

BACKGROUND OF THE INVENTION

There are a variety of processes in which solid particles are separated from a flowing gas stream. These types of separations are particularly common in many chemical and combustion type processes.

U.S. Pat. No. 6,166,282 shows a fluid bed reaction process in which catalyst is flowed with gas feed and product. The catalyst particles are separated from the product using cyclone separators and the separated catalyst is returned back to the process.

U.S. Patent Publication No. 2003/0200864 describes an acoustic agglomeration system that is used to agglomerate small particles in order to make them easier to separate from flowing fluids. The agglomeration method involves applying an acoustic field to a fluid that contains small particles. This causes the particles to agglomerate, forming larger particles, and the larger particles are separated from the flowing fluid.

U.S. Pat. No. 5,419,877 is also directed to the use of acoustic force to remove particles from a gas stream. The patent indicates that cyclonic separators are typically used in high temperature environments to separate particles with diameters greater than 5 microns. An acoustic barrier separator is used to remove particularly small diameter fly ash and hazardous volatiles from high temperature gas emissions.

U.S. Pat. No. 6,224,652 discloses a method and device for agglomerating particles in a gaseous flow through an acoustical agglomeration chamber. The method includes extracting a portion of gaseous flow from the outlet of an acoustical agglomeration chamber. The extracted gaseous flow is then passed through a feedback-loop, and large particles are reinjected into the inlet of the chamber. The device includes a fan that accomplishes reinjecting the extracted gaseous flow back into the chamber.

There is a need for more efficient methods of separating small particles from reaction systems. Particularly needed are efficient methods of separating small catalyst particles from a gas and particle mixture, preferably in a fluidized bed catalytic system.

SUMMARY OF THE INVENTION

This invention provides a process that efficiently separates small particles from flowing gases. In particular, the invention efficiently separates small catalyst particles by applying an acoustic waveform to agglomerate the particles. The particles are preferably agglomerated in a dilute phase zone of a fluidized bed system, and the agglomerated particles are separated using a separation device.

According to one aspect of the invention, there is provided a process for removing catalyst particles from a dilute phase zone of a vessel and recovering the catalyst particles in a dense phase zone. The process includes flowing gas and catalyst particles into a dilute phase zone. An acoustic waveform is applied to the dilute phase zone to agglomerate at least a portion of catalyst particles in the dilute phase zone. At least a portion of the agglomerated particles is removed from the dilute phase zone, and at least a portion of the removed particles is recovered in a dense phase zone.

In another aspect of the invention, there is provided a process for separating solid particles from a gas composition in a vessel having a dilute phase zone and a dense phase zone such that the dilute phase zone has a particle density less than that of the dense phase zone. The process includes applying an acoustic waveform to the dilute phase zone to agglomerate at least a portion of the particles in the gas composition. At least a portion of the gas and agglomerated particles is flowed through one or more cyclones to separate at least a portion of the agglomerated particles from the gas, and at least a portion of the separated particles is sent to the dense phase zone of the vessel.

In yet another aspect, there is provided a process for separating catalyst particles from hydrocarbon. The process comprises flowing a hydrocarbon feed gas through a fluidized catalyst bed to convert the feed gas to hydrocarbon product, The hydrocarbon product is flowed through a dilute phase zone having a catalyst density less than that of the fluidized catalyst bed. Catalyst particles in the dilute phase zone are contacted with an acoustic waveform to agglomerate at least a portion of the catalyst particles, and at least a portion of the agglomerated catalyst particles and hydrocarbon product are flowed to one or more cyclones to separate at least a portion of the agglomerated particles from the gas.

In one embodiment of the invention, the catalyst particles are molecular sieve catalyst particles. Preferably, the catalyst particles have an ARI of not greater than 5 wt %/hr.

In another embodiment, the catalyst particles have a particle size distribution such that not greater than about 20 wt % of the catalyst particles in the dense phase zone have an average diameter less than or equal to 20 μm. Alternatively, the catalyst particles have a particle size in which not greater than about 20 wt % of the catalyst particles in the dense phase zone have an average diameter greater than or equal to about 250 μm. The catalyst particles can also have a particle size in which not greater than about 20 wt % of the catalyst particles in the dense phase zone have an average diameter greater than or equal to about 250 μm.

In another embodiment, the dilute phase zone has a particle density less than that of the dense phase zone. Preferably, the catalyst particles in the dense phase zone have a particle size distribution in μm of $1<d_{10}<75$; $20<d_{50}<200$; and $50<d_{90}<400$.

In yet another embodiment, the dilute phase zone has a solid volume of from about 0.01% to about 15%. In another, the dilute phase zone typically has about 1% or less solid volume as that contained in the dense phase zone. Preferably, the dense phase zone has a solid volume content of from about 20% to about 40%. It is also preferred that the dilute phase zone and dense phase zone located in a common vessel.

In another embodiment of the invention, the acoustic waveform is amplitude modulated, frequency modulated, or both amplitude and frequency modulated. Preferably, the acoustic waveform is modulated in a frequency range of up to 1 GHz. In another embodiment, the acoustic waveform is modulated in amplitude range of up to 200 dB referenced to 20 micro-Pascals. Preferably, the acoustic waveform is applied as a standing waveform. In another preferred embodiment, the agglomerated particles are removed using a disengaging unit.

DETAILED DESCRIPTION OF THE DRAWING

FIG. 1 shows the flow of gas and fluidized solids through a vessel and subsequent separation of the solids from the gas.

DETAILED DESCRIPTION OF THE INVENTION

I. Application of Waveform and Particle Agglomeration

This invention is directed to a process for removing catalyst particles from a gas. The invention is particularly suited to separating particles from the gas in a vessel that has a dilute phase zone and a dense phase zone. The dilute phase zone is a zone in which particle density of the catalyst is less than that of the catalyst in the dense phase zone. Typically, the dilute phase zone is located above the dense phase zone.

An acoustic waveform is applied to the dilute phase zone to assist in separating small particles from the gas in the dilute phase zone. Application of an acoustic waveform in the dilute phase zone causes the small particles in the dilute phase to have an increased number of collisions between particles. The particles are of such a character that the increased collisions will cause the particles to agglomerate. As the particles become agglomerated, they increase in overall diameter and weight. This increase allows the particles to be more easily separated from the gas using any variety of separation devices.

II. Acoustic Waveform

According to this invention, acoustic energy is applied to the dilute phase zone. As generally understood, acoustic is defined as of or related to sound.

Using an acoustic waveform means that the acoustic energy is applied as a waveform. As generally understood, a waveform is typically a representation of a shape of a wave (e.g., sine wave). In the case of acoustic energy, a waveform would be typically represented according to frequency and amplitude.

The frequency and amplitude of the acoustic waveform can be varied or modulated as appropriate to maximize the agglomeration of particles. In one embodiment, the acoustic waveform is amplitude modulated. In another, the acoustic waveform is frequency modulated. In yet another, the acoustic waveform is both amplitude and frequency modulated.

The frequency of the acoustic waveform is applied so as to achieve agglomeration of particles to a predetermined. The frequency can be modulated exponentially, linearly, non-linearly, or applied for a periodic interval. In one embodiment of the invention, the frequency of the acoustic waveform is modulated in a range of up to 1 GHz. In another embodiment, the acoustic waveform is modulated in a range starting at a frequency of at least 20 Hz, or a range of from about 20 Hz to about 1 GHz.

According to another aspect of the invention, the acoustic waveform is modulated in a range of up to 200 dB referenced to 20 micro-Pascals. In one embodiment of the invention, the acoustic waveform is modulated in a range of from about 50 dB to about 200 dB or about 125 dB to about 175 dB referenced to 200 micro-Pascals.

In one embodiment of the invention, the a plurality of acoustic waveforms is applied to the fluid. In particular embodiment, each of the waveforms is provided at approximately the same frequency, amplitude or combination of frequency and amplitude modulation. In another embodiment, at least one of a plurality of acoustic waveforms is provided at a different frequency, amplitude or combination of frequency and amplitude modulation than that of at least one other waveform that is applied.

In another embodiment, at least two waveforms are applied so that a standing waveform is applied. Preferably, a generated wave enters one wall of a vessel or container, goes across a dilute phase in the vessel or container, bounces off a wall at an opposing end of the vessel or container, and returns in a manner that is considered superimposed on the generated or entering wave. More preferably, the frequency of the superimposed or standing wave is adjusted so a finite number of cycles covers the distance across the vessel.

In yet another embodiment, at least two waveforms are applied so that a complex waveform (e.g., sawtooth wave shape) is formed. Periodic or aperiodic waveforms can also be applied.

III. Dilute and Dense Phase Zones and Reaction Systems

The acoustic waveform is applied to the dilute phase zone in order to agglomerate small particles into larger particles. The dilute phase zone has a lower catalyst density than that of the dense phase zone.

In this invention, catalyst density in each zone is more clearly defined according to percent of solid volume in that particular zone. For example, the dilute phase zone typically has a solid volume of from about 0.01% to about 15% or from about 0.02% to about 1% or about 0.03% to about 0.1% The dilute phase zone typically has about 1% or less of the solid volume contained in the dense phase zone, preferably about 0.1% or less, and more preferably about 0.01% or less. In one embodiment of the invention, the dense phase zone has a solid volume content of from about 20% to about 40%. In another embodiment, the dense phase zone has a solid volume content from about 15% to about 35%.

The dilute and dense phase zones can be in the same or in separate vessels. Preferably, the dilute and dense phase zones are in the same vessel. The vessel or vessels can be part of a chemical reaction system, and the vessel or vessel is more typically one or more reactor or regenerator vessels.

The catalyst removal and separation processes of this invention can be applied in any reaction system capable for performing reactions involving solid catalyst particles entrained in a gas-solids flow. Non-limiting examples of such reaction systems include reaction systems selected from the group consisting of catalytic cracking reaction systems, transalkylation reaction systems, isomerization reaction systems, catalytic dewaxing systems, alkylation reaction systems, hydrocracking reaction systems, systems for converting paraffins to olefins, systems for converting paraffins to aromatics, systems for converting olefins to gasoline, systems for converting olefins to distillate, systems for converting olefins to lubes, systems for converting alcohols to olefins, disproportionation reaction systems, systems for converting aromatics to higher aromatics, systems for adsorbing aromatics, systems for converting oxygenates (e.g., alcohols) to olefins, systems for converting oxygenates (e.g., alcohols) to aromatics or gasoline, systems for oligomerizing olefins, and systems for converting unsaturated hydrocarbons to aldehydes. More specifically, such examples include:

A) The catalytic cracking of a naphtha feed to produce light olefins. Typical reaction conditions include from about 500° C. to about 750° C., pressures of subatmospheric or atmospheric, generally ranging up to about 10 atmospheres (gauge) and residence time (time of contact of feed and/or product with catalyst) from about 10 milliseconds to about 10 seconds;

B) The catalytic cracking of high molecular weight hydrocarbons to lower weight hydrocarbons. Typical reaction conditions for catalytic cracking include temperatures of from about 400° C. to about 700° C., pressures of from about 0.1 atmosphere (bar) to about 30 atmospheres, and weight hourly space velocities of from about 0.1 $hr^{-1}$ to about 100 $hr^{-1}$;

C) The transalkylation of aromatic hydrocarbons in the presence of polyalkylaromatic hydrocarbons. Typical reaction conditions include a temperature of from about 200° C. to about 500° C., a pressure of from about atmospheric to about 200 atmospheres, a weight hourly space velocity of from about 1 $hr^{-1}$ to about 100 $hr^{-1}$, and an aromatic hydrocarbon/polyalkylaromatic hydrocarbon mole ratio of from about 1/1 to about 16/1;

D) The isomerization of aromatic (e.g., xylene) feedstock components. Typical reaction conditions for such include a temperature of from about 230° C. to about 510° C., a pressure of from about 0.5 atmospheres to about 50 atmospheres, a weight hourly space velocity of from about 0.1 $hr^{-1}$ to about 200 $hr^{-1}$, and a hydrogen/hydrocarbon mole ratio of from about 0 to about 100/1;

E) The catalytic dewaxing of hydrocarbons by selectively removing straight chain paraffins. The reaction conditions are dependent in large measure on the feed used and upon the desired pour point. Typical reaction conditions include a temperature between about 200° C. and 450° C., a pressure of up to 3,000 psig and a liquid hourly space velocity from 0.1 $hr^{-1}$ to 20 $hr^{-1}$.

F) The alkylation of aromatic hydrocarbons, e.g., benzene and alkylbenzenes, in the presence of an alkylating agent, e.g., olefins, formaldehyde, alkyl halides and alcohols having 1 to about 20 carbon atoms. Typical reaction conditions include a temperature of from about 100° C. to about 500° C., a pressure of from about atmospheric to about 200 atmospheres, a weight hourly space velocity of from about 1 $hr^{-1}$ to about 100 $hr^{-1}$, and an aromatic hydrocarbon/alkylating agent mole ratio of from about 1/1 to about 20/1;

G) The alkylation of aromatic hydrocarbons, e.g., benzene, with long chain olefins, e.g., $C_{14}$ olefin. Typical reaction conditions include a temperature of from about 50° C. to about 200° C., a pressure of from about atmospheric to about 200 atmospheres, a weight hourly space velocity of from about 2 $hr^{-1}$ to about 2000 $hr^{-1}$, and an aromatic hydrocarbon/olefin mole ratio of from about 1/1 to about 20/1. The resulting products from the reaction are long chain alkyl aromatics, which when subsequently sulfonated have particular application as synthetic detergents;

H) The alkylation of aromatic hydrocarbons with light olefins to provide short chain alkyl aromatic compounds, e.g., the alkylation of benzene with propylene to provide cumene. Typical reaction conditions include a temperature of from about 10° C. to about 200° C., a pressure of from about 1 to about 30 atmospheres, and an aromatic hydrocarbon weight hourly space velocity (WHSV) of from 1 $hr^{-1}$ to about 50 $hr^{-1}$;

I) The hydrocracking of heavy petroleum feedstocks, cyclic stocks, and other hydrocrack charge stocks. The catalyst will contain an effective amount of at least one hydrogenation component;

J) The alkylation of a reformate containing substantial quantities of benzene and toluene with fuel gas containing short chain olefins (e.g., ethylene and propylene) to produce mono- and dialkylates. Preferred reaction conditions include temperatures from about 100° C. to about 250° C., a pressure of from about 100 psig to about 800 psig, a WHSV-olefin from about 0.4 $hr^{-1}$ to about 0.8 $hr^{-1}$, a WHSV-reformate of from about 1 $hr^{-1}$ to about 2 $hr^{-1}$ and, optionally, a gas recycle from about 1.5 to about 2.5 vol/vol fuel gas feed;

K) The alkylation of aromatic hydrocarbons, e.g., benzene, toluene, xylene, and naphthalene, with long chain olefins, e.g., $C_{14}$ olefin, to produce alkylated aromatic lube base stocks. Typical reaction conditions include temperatures from about 100° C. to about 400° C. and pressures from about 50 psig to 450 psig;

L) The alkylation of phenols with olefins or equivalent alcohols to provide long chain alkyl phenols. Typical reaction conditions include temperatures from about 100° C. to about 250° C., pressures from about 1 to 300 psig and total WHSV of from about 2 $hr^{-1}$ to about 10 $hr^{-1}$;

M) The conversion of light paraffins to olefins and/or aromatics. Typical reaction conditions include temperatures from about 425° C. to about 760° C. and pressures from about 10 psig to about 2000 psig;

N) The conversion of light olefins to gasoline, distillate and lube range hydrocarbons. Typical reaction conditions include temperatures of from about 175° C. to about 375° C., and a pressure of from about 100 psig to about 2000 psig;

O) Two-stage hydrocracking for upgrading hydrocarbon streams having initial boiling points above about 200° C. to premium distillate and gasoline boiling range products or as feed to further fuels or chemicals processing steps. Either stage of the two-stage system can contain catalyst, which contains molecular sieve that is susceptible to loss of catalytic activity due to contact with water molecules. Typical reaction conditions include temperatures of from about 315° C. to about 455° C., pressures of from about 400 to about 2500 psig, hydrogen circulation of from about 1000 SCF/bbl to about 10,000 SCF/bbl and a liquid hourly space velocity (LHSV) of from about 0.1 $hr^{-1}$ to 10 $hr^{-1}$;

P) A combination hydrocracking/dewaxing process in the presence of a catalyst that contains molecular sieve that is susceptible to loss of catalytic activity due to contact with water molecules. The catalyst generally further comprises a hydrogenation component. Optionally included in the catalyst is zeolite molecular sieve such as zeolite Beta. Typical reaction conditions include temperatures from about 35.0° C. to about 400° C., pressures from about 1400 psig to about 1500 psig, LHSVs from about 0.4 $hr^{-1}$ to about 0.6 $hr^{-1}$ and a hydrogen circulation from about 3000 to about 5000 SCF/bbl;

Q) The reaction of alcohols with olefins to provide mixed ethers, e.g., the reaction of methanol with isobutene and/or isopentene to provide methyl-t-butyl ether (MTBE) and/or t-amyl methyl ether (TAME). Typical conversion conditions include temperatures from about 20° C. to about 200° C., pressures from 2 to about 200 atm, WHSV (gram-olefin per hour gram-zeolite) from about 0.1 hr$^{-1}$ to about 200 hr$^{-1}$ and an alcohol to olefin molar feed ratio from about 0.1/1 to about 5/1;

R) The disproportionation of aromatics, e.g., the disproportionation toluene to make benzene and paraxylene. Typical reaction conditions include a temperature of from about 200° C. to about 760° C., a pressure of from about atmospheric to about 60 atmosphere (bar), and a WHSV of from about 0.1 hr$^{-1}$ to about 30 hr$^{-1}$;

S) The conversion of naphtha (e.g., $C_6$-$C_{10}$) and similar mixtures to highly aromatic mixtures. Thus, normal and slightly branched chained hydrocarbons, preferably having a boiling range above about 40° C., and less than about 200° C., can be converted to products having a substantially higher octane aromatics content by contacting the hydrocarbon feed with a molecular sieve catalyst at a temperature of from about 400° C. to 600° C., preferably from about 480° C. to about 550° C., at pressures of from atmospheric to 40 bar, and liquid hourly space velocities (LHSV) of from 0.1 hr$^{-1}$ to 15 hr$^{-1}$;

T) The adsorption of alkyl aromatic compounds for the purpose of separating various isomers of the compounds;

U) The conversion of oxygenates, e.g., alcohols, such as methanol, or ethers, such as dimethylether, or mixtures thereof to hydrocarbons including olefins and aromatics with reaction conditions including temperatures of from about 275° C. to about 600° C., pressures of from about 0.5 atmosphere to about 50 atmospheres, and a liquid hourly space velocity of from about 0.1 hr$^{-1}$ to about 100 hr$^{-1}$;

V) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a molecular sieve catalyst at a temperature in the range of from about 250° C. to about 800° C., a LHSV of from about 0.2 hr$^{-1}$ to about 50 hr$^{-1}$, and a hydrocarbon partial pressure of from about 0.1 to about 50 atmospheres. Temperatures below about 250° C. may be used to oligomerize the feedstock when the feedstock is in the liquid phase when contacting the coated zeolite catalyst. Thus, when the olefin feedstock contacts the catalyst in the liquid phase, temperatures of from about 110° C. to about 250° C. may be used;

W) The conversion of $C_2$ unsaturated hydrocarbons (ethylene and/or acetylene) to aliphatic $C_{6-12}$ aldehydes and converting said aldehydes to the corresponding $C_{6-12}$ alcohols, acids, or esters.

In general, reactor conditions include a temperature of from about 100° C. to about 760° C., a pressure of from about 0.1 atmosphere (bar) to about 200 atmospheres (bar), a weight hourly space velocity of from about 0.08 hr$^{-1}$ to about 2,000 hr$^{-1}$.

The gas used in the reaction system and process of this invention is an appropriate gas used in the particular process in which the gas is mixed with the catalyst particles in a reaction vessel. In one embodiment, the gas is a hydrocarbon feed gas that is contacted with the catalyst particles. This embodiment is particularly encountered in cases where the dilute and dense phase zones are located in one reactor vessel. Examples of hydrocarbon gases that are mixed with the catalyst particles are gases such as those mentioned in the particular reactions systems above.

In another embodiment of the invention, the gas used in the reaction system and process of this invention is an appropriate gas used in the particular process in which the gas is mixed with the catalyst particles in a regenerator vessel. In one embodiment, the gas is a regeneration medium that is contacted with the catalyst particles. This embodiment is particularly encountered in cases where the dilute and dense phase zones are located in one regenerator vessel. Examples of regeneration gases that are mixed with the catalyst particles include gases containing oxygen. Non-limiting examples of suitable regeneration media include compositions comprising one or more of $O_2$, $O_3$, $SO_3$, $N_2O$, NO, $NO_2$, $N_2O_5$ and $H_2O$. A particularly preferred regeneration medium is one that contains $O_2$, for example, air. Suitable regeneration conditions are those capable of burning coke from a coked catalyst composition, preferably to a coke level less than 0.5 weight percent, based on the total weight of the catalyst. The regeneration pressure may be in the range of from about 15 psia (103 kpaa) to about 500 psia (3448 kpaa), such as from about 20 psia (138 kPaa) to about 250 psia (1724 kPaa), including from about 25 psia (172 kPaa) to about 150 psia (1034 kpaa), and conveniently from about 30 psia (207 kpaa) to about 60 psia (414 kPaa).

The catalyst particle separation and removal processes of this invention are particularly suited to large, commercial scale reaction systems. For example, the separation processes of this invention are particularly suited to reaction systems that require a catalyst loading of at least about 1,000 kg of catalyst, based on total amount of catalyst located throughout the reaction system. In particular, the separation processes of this invention are particularly suited to reaction systems that require a catalyst loading of at least about 10,000 kg of catalyst, more particularly a catalyst loading of at least about 100,000 kg of catalyst, and most particularly a catalyst loading of at least about 250,000 kg of catalyst, based on total amount of catalyst located throughout the reaction system.

In one embodiment of this invention, the gas and solid particles are flowed through a vessel containing the dilute and dense phase zone at a weight hourly space velocity (WHSV) of from about 1 hr$^{-1}$ to about 5,000 hr$^{-1}$, preferably from about 5 hr$^{-1}$ to about 3,000 hr$^{-1}$, more preferably from about 10 hr$^{-1}$ to about 1,500 hr$^{-1}$, and most preferably from about 20 hr$^{-1}$ to about 1,000 hr$^{-1}$. In one preferred embodiment, the WHSV is greater than 25 hr$^{-1}$, and up to about 500 hr$^{-1}$. In this invention, WHSV is defined as the total weight per hour of the gas flowing between reactor walls divided by the total weight of the solids flowing between the same segment of reactor walls. The WHSV is maintained at a level sufficient to keep the catalyst composition in a fluidized state within a reactor.

In another embodiment of the invention, cyclones are used to separate the agglomerated particles from the gas composition in which the particles are entrained, and send those particles to the dense phase portion of the catalyst via catalyst diplegs. In general, the larger, agglomerated particles tend to be separated out more easily, and the larger particles end up falling back down toward the bottom of the vessel, which is where the dense phase portion of the catalyst is located. This also reduces the amount of particles in the dilute phase zone of the vessel, thereby reducing the amount of particles that end up being recycled back to the cyclones. As a further result, increase in the efficiency of the cyclone operation is achieved.

In still another embodiment, cyclones configured according to this invention can be used with a fixed fluidized bed reactor. In such an embodiment, the GSV can be as low as 0.03 m/s.

In one particular embodiment, the process of this invention is conducted as a fluidized bed process or high velocity fluidized bed process utilizing a reactor system, a regeneration system and a recovery system. In such a process the reactor system includes a fluid bed reactor system having a first reaction region consisting of at least one dense phase zone and at least one dilute phase zone in series. The system further includes at least one disengaging zone for separating or removing the catalyst particles from the gas, preferably for separating or removing the catalyst particles from the gas in the dilute phase zone. Preferably, the disengaging zone includes one or more cyclones for separating or removing the catalyst particles. In one embodiment, the fast fluid bed or dense phase zone, the dilute phase zone and the disengaging zone are contained within a single reactor or regenerator vessel.

IV. Solid Particles

In an embodiment, the invention is generally useful for separating any solid particles in a gas-solids flow. In another embodiment, the solid particles can be catalyst particles, such as molecular sieve catalyst particles.

In an embodiment, a molecular sieve catalyst can be characterized according to an Attrition Rate Index (ARI). The ARI methodology is similar to the conventional Davison Index method. The smaller the ARI, the more resistant to attrition. The ARI is measured by adding 6.0±0.1 g of catalyst, having a particle size ranging from 53 to 125 microns, into a hardened steel attrition cup. Approximately 23,700 scc/min of nitrogen gas is bubbled through a water-containing bubbler to humidify the nitrogen. The wet nitrogen is passed through the attrition cup, and exits the attrition apparatus through a porous fiber thimble. The flowing nitrogen removes the finer particles, with the larger particles being retained in the cup. The porous fiber thimble separates the fine catalyst particles from the nitrogen that exits through the thimble. The fine particles remaining in the thimble represent catalyst that has broken apart through attrition.

The nitrogen flow passing through the attrition cup is maintained for 1 hour. Fines collected in the thimble are removed from the unit, and a new thimble installed. The catalyst left in the attrition unit is attrited for an additional 3 hours, under the same gas flow and moisture levels. The fines collected in the thimble are recovered. The collection of fine catalyst particles separated by the thimble after the first hour are weighed. The amount in grams of fine particles divided by the original amount of catalyst charged to the attrition cup expressed on per hour basis is the ARI, in wt %/hr.

$$ARI=[C/(B+C)/D]\times 100\%$$

wherein

B=weight of catalyst left in the cup after the attrition test;
C=weight of collected fine catalyst particles after the first hour of attrition treatment; and
D=duration of treatment in hours after the first hour attrition treatment.

In an embodiment, the molecular sieve catalyst of this invention has an ARI of not greater than about 5 wt %/hr. Preferably, the molecular sieve catalyst has an ARI of not greater than about 2 wt %/hr, more preferably not greater than about 1 wt %/hr.

Molecular sieve catalyst particles for use in a reaction can be synthesized by a variety of methods. In an embodiment, catalyst particles are synthesized by combining a first dried molecular sieve catalyst with water to make a water-catalyst composition, making a slurry from the water-catalyst composition, and drying the slurry to produce a second dried molecular sieve catalyst. The method particularly provides for the re-manufacturing, recycling or re-working of dried or substantially dried, or partially dried molecular sieve catalysts to yield catalyst particles with properties that are acceptable to the user or manufacturer. Such properties are usually observed after the dried molecular sieve catalyst is calcined. These properties include acceptable particle size, particle size distribution, and particle density.

In one embodiment, the catalyst particles have an apparent bulk density (ABD) of at least 0.65 g/cc. Preferably, the catalyst particles an ABD at least 0.75 g/cc, more preferably at least 0.8 g/cc, and most preferably at least 0.85 g/cc. Generally, the catalyst density is not significantly greater than water. In one embodiment, the catalyst composition has an ABD not greater than 1.1 g/cc, preferably not greater than 1 g/cc. More preferably, the catalyst composition has an ABD not greater than 0.99 g/cc, and most preferably not greater than 0.98 g/cc.

According to the invention, one way of measuring ABD was using the following procedure. A KIMAX graduated cylinder from KAMLE USA, accurate to 0.05 cc and having a 25 cc capacity, was used to weigh catalyst. The empty cylinder was weighed and the weight recorded as $W_a$. Approximately 25 cc of spray dried and calcined catalyst was poured into the cylinder, and the cylinder was tapped against a lab bench surface at a frequency of 160-170 times per minute for 30 seconds to pack the cylinder into the cylinder. The weight of the packed cylinder was weighed and recorded as $W_b$. The volume of the catalyst in the cylinder was determined by reading the level of the packed catalyst in the cylinder and recorded as $V_c$. ABD was then calculated as $ABD=(W_b-W_a)/V_c$.

In one embodiment of the invention, the catalyst particles have a particle size distribution such that not greater than about 20 wt % of the catalyst particles in the dense phase zone have an average diameter less than or equal to 20 µm. Preferably, the catalyst particles in the dense phase zone have a particle size distribution such that not greater than about 10 wt % of the catalyst particles in the dense phase zone have an average diameter less than or equal to 20 µm; more preferably not greater than about 5 wt % of the catalyst particles have an average diameter less than or equal to 20 µm.

In general, in this invention, the particle size of the catalyst in the dilute phase is less than that of the catalyst in the dense phase. This invention also results in the reduction of the amount of solids in the dilute phase.

In another embodiment, the catalyst particles have a particle size in which not greater than about 20 wt % of the catalyst particles in the dense phase zone have an average diameter greater than or equal to about 250 µm. Preferably, not greater than about 10 wt % of the catalyst particles in the dense phase zone have an average diameter greater than or equal to about 250 µm; more preferably not greater than about 5 wt % of the catalyst particles in the dense phase zone have an average diameter greater than or equal to 250 µm.

In another embodiment of the invention, the catalyst particles have a particle size distribution particularly suited for use in fluidized bed reaction systems. For example, in one embodiment, the catalyst in the dense phase zone has a particle size distribution in µm of $1<d_{10}<75$; $20<d_{50}<200$; and $50<d_{90}<400$, wherein $d_{10}$ is the average diameter in which the cumulative volume of the sample reaches 10% of the total, $d_{50}$ is the average diameter in which the cumulative volume of the sample reaches 50% of the total, and $d_{90}$ is the average diameter in which the cumulative volume of the sample reaches 90% of the total. Preferably, the hardened molecular sieve catalyst has a particle size distribution in μm of $2<d_{10}<60$; $30<d_{50}<150$; and $60<d_{90}<300$.

The catalyst particles of this invention can include any of a variety of molecular sieve components. The components include zeolites or non-zeolites, preferably non-zeolites. In one embodiment, the molecular sieves are small pore non-zeolite molecular sieves having an average pore size of less than about 5 angstroms, preferably an average pore size ranging from about 3 to 5 angstroms, more preferably from 3.5 to 4.2 angstroms. These pore sizes are typical of molecular sieves having 8 membered rings.

Conventional crystalline aluminosilicate zeolites having catalytic activity are desirable molecular sieves that can be used in making the catalyst of this invention. Examples of such zeolite materials are described in U.S. Pat. Nos. 3,660, 274 and 3,944,482, both of which are incorporated herein by reference. Non-limiting examples of zeolites which can be employed in the practice of this invention, include both natural and synthetic zeolites. These zeolites include zeolites of the structural types included in the *Atlas of Zeolite Framework Types*, edited by Ch. Baerlocher, W. M. Meier, D. H. Olson, Fifth Revised edition, Elsevier, Amsterdam, 2001.

In another embodiment, the catalyst particles which are flowed through the gas-solids reactor system of this invention are molecular sieve catalysts, such as a conventional molecular sieve. Examples include zeolite as well as non-zeolite molecular sieves, and are of the large, medium or small pore type. Non-limiting examples of these molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW and SOD. Non-limiting examples of the preferred molecular sieves, particularly for converting an oxygenate containing feedstock into olefin(s), include AEL, AFY, BEA, CHA, EDI, FAU, FER, GIS, LTA, LTL, MER, MFI, MOR, MTT, MWW, TAM and TON. In one preferred embodiment, the molecular sieve of the invention has an AEI topology or a CHA topology, or a combination thereof, most preferably a CHA topology.

Particularly preferred silicon, aluminum and/or phosphorous containing molecular sieves, and aluminum, phosphorous, and optionally silicon, containing molecular sieves include aluminophosphate (ALPO) molecular sieves and silicoaluminophosphate (SAPO) molecular sieves and substituted, preferably metal substituted, ALPO and SAPO molecular sieves. The most preferred molecular sieves are SAPO molecular sieves, and metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as $[MeO_2]$, and carry a net charge depending on the valence state of the metal substituent. For example, in one embodiment, when the metal substituent has a valence state of +2, +3, +4, +5, or +6, the net charge of the tetrahedral unit is between −2 and +2.

Non-limiting examples of SAPO molecular sieves useful herein include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56 and metal containing molecular sieves thereof. Of these, particularly useful molecular sieves are SAPO-18, SAPO-34, SAPO-35, SAPO-44, SAPO-56 and metal containing derivatives thereof. SAPO-34 is particularly preferred.

In another embodiment of the invention, the catalyst used in this invention incorporates aluminophosphate (AlPO) molecular sieves. These molecular sieves can be included as separate crystals or they can be intermixed with other crystalline structures such as by an intergrowth structure. Examples of aluminophosphates include AlPO-5, AlPO-11, AlPO-18, AlPO-31, AlPO-34, AlPO-36, AlPO-37 and AlPO-46.

In one embodiment, the catalyst includes a combination of at least one SAPO and at least one AlPO molecular sieve, wherein the SAPO is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47 and SAPO-56, and the AlPO is selected from the group consisting of AlPO-5, AlPO-11, AlPO-18, AlPO-31, AlPO-34, AlPO-36, AlPO-37 and AlPO-46. The sieves can be combined as separate crystals or as intergrown crystals. Preferably, the SAPO is SAPO-18 or SAPO-34, and preferably, the AlPO is AlPO-34 or AlPO-18.

Additional examples of intergrowth molecular sieves useful in this invention include those described in U.S. Patent Application Publication No. 2002-0165089 and International Publication No. WO 98/15496, published Apr. 16, 1998. Note that SAPO-18, AlPO-18 and RUW-18 have an AEI framework-type, and SAPO-34 has a CHA framework-type, and that preferred molecular sieves used herein may comprise at least one intergrowth phase of AEI and CHA framework-types, especially where the ratio of CHA framework-type to AEI framework-type, as determined by the DIFFaX method disclosed in U.S. Patent Application Publication No. 2002-0165089, is greater than 1:1.

The molecular sieves are made or formulated into catalysts by combining the synthesized molecular sieves with a binder and/or a matrix material to form a molecular sieve catalyst composition or a formulated molecular sieve catalyst composition. This formulated molecular sieve catalyst composition is formed into useful shape and sized particles by conventional techniques such as spray drying, pelletizing, extrusion, and the like.

V. Example

An example of this invention is described according to FIG. 1, which depicts a fluidized bed reactor vessel, although the vessel could equally be depicted as a fluidized bed regenerator vessel. According to FIG. 1, hydrocarbon gas enters the vessel 10 by way of a line 12. The gas flows through a dense phase zone of fluidized catalyst particles 14, and the hydrocarbon gas is converted to a gas product as it flows through the dense phase zone.

As the product gas emerges from the dense phase zone 14, it enters into a dilute phase zone 16. As the product gas enters into the dilute phase zone 16, a portion of catalyst particles from the dense phase zone are carried with the product gas. Ultimately, the product gas is separated from the catalyst particles by a disengaging unit 18, located in the dilute phase zone 16. Product gas exits the disengaging unit 18 and passes through an outline line 20. The separated catalyst particles exit the disengaging unit 18 by way of diplegs 22a, 22b. From the diplegs 22a and 22b, the catalyst particles are ultimately returned to the dense phase zone 14.

To aid in separation of the particles from the gas, an acoustic waveform generator 24 is used. The generator 24 applies an acoustic waveform 26 to the dilute phase zone 16 such that increased collisions between particles occur. This causes smaller particles to coalesce or bind together, effectively generating overall larger and heavier particles. These larger particles either fall back down into the dense bed before passing through the disengaging unit 18 or are more easily separated from the gas in the disengaging unit 18, and are more readily and efficiently returned to the dense phase zone 14 as a result.

The principles and modes of operation of this invention have been described above with reference to various exemplary and preferred embodiments. As understood by those of skill in the art, the overall invention, as defined by the claims, encompasses other preferred embodiments not specifically enumerated herein.

What is claimed is:

1. A process for removing catalyst particles from a dilute phase zone of a vessel and recovering the catalyst particles in a dense phase zone, comprising:
    flowing a gas through a dense phase zone of fluidized catalyst particles, wherein the catalyst particles have a particle size distribution such that not greater than about 20 wt % of the catalyst particles in the dense phase zone have an average diameter less than or equal to 20 μm;
    flowing the gas containing at least a portion of smaller catalyst particles into a dilute phase zone;
    applying an acoustic waveform to the dilute phase zone to agglomerate at least a portion of the smaller catalyst particles in the dilute phase zone;
    removing at least a portion of the agglomerated particles from the dilute phase zone; and recovering at least a portion of the removed particles in a dense phase zone.

2. The process of claim 1, wherein the gas is a hydrocarbon or regeneration medium.

3. The process of claim 1, wherein the catalyst particles are molecular sieve catalyst particles.

4. The process of claim 1, wherein the catalyst particles have an ARI of not greater than 5 wt %/hr.

5. The process of claim 1, wherein the dilute phase zone has a particle density less than that of the dense phase zone.

6. The process of claim 1, wherein the catalyst particles have a particle size in which not greater than about 20 wt % of the catalyst particles in the dense phase zone have an average diameter greater than or equal to about 250 μm.

7. The process of claim 1, wherein the catalyst particles in the dense phase zone have a particle size distribution in μm of $1<d_{10}<75$; $20<d_{50}<200$; and $50<d_{90}<400$.

8. The process of claim 1, wherein the dilute phase zone has a solid volume of from about 0.01% to about 15%.

9. The process of claim 1, wherein the dilute phase zone typically has about 1% or less solid volume as that contained in the dense phase zone.

10. The process of claim 1, wherein, the dense phase zone has a solid volume content of from about 20% to about 40%.

11. The process of claim 1, wherein the dilute phase zone and dense phase zone located in a common vessel.

12. The process of claim 1, wherein the acoustic waveform is amplitude modulated, frequency modulated, or both amplitude and frequency modulated.

13. The process of claim 1, wherein the acoustic waveform is modulated in a frequency range of up to 1 GHz.

14. The process of claim 1, wherein the acoustic waveform is modulated in amplitude range of up to 200 dB referenced to 20 micro-Pascals.

15. The process of claim 1, wherein the acoustic waveform is applied as a standing waveform.

16. The process of claim 1, wherein the agglomerated particles are removed using a disengaging unit.

17. A process for separating solid particles from a gas composition in a vessel having a dilute phase zone and a dense phase zone, wherein the dilute phase zone has a particle density less than that of the dense phase zone, the process comprising:
    flowing a gas through a dense phase zone of fluidized catalyst particles, wherein the catalyst particles have a particle size distribution such that not greater than about 20 wt % of the catalyst particles in the dense phase zone have an average diameter less than or equal to 20 μm;
    flowing the gas composition containing at least a portion of smaller solid particles through the dilute phase zone of the vessel;
    applying an acoustic waveform to the dilute phase zone to agglomerate at least a portion of the smaller particles in the gas composition;
    flowing at least a portion of the gas and agglomerated particles through one or more cyclones to separate at least a portion of the agglomerated particles from the gas; and
    sending at least a portion of the separated particles to the dense phase zone of the vessel.

18. The process of claim 17, wherein the gas is a hydrocarbon or regeneration medium.

19. The process of claim 17, wherein the catalyst particles are molecular sieve catalyst particles.

20. The process of claim 17, wherein the catalyst particles have an ARI of not greater than 5 wt %/hr.

21. The process of claim 17, wherein the dilute phase zone has a particle density less than that of the dense phase zone.

22. The process of claim 17, wherein the catalyst particles have a particle size in which not greater than about 20 wt % of the catalyst particles in the dense phase zone have an average diameter greater than or equal to about 250 μm.

23. The process of claim 17, wherein the catalyst particles in the dense phase zone have a particle size distribution in μm of $1<d_{10}<75$; $20<d_{50}<200$; and $50<d_{90}<400$.

24. The process of claim 17, wherein the dilute phase zone has a solid volume of from about 0.01% to about 15%.

25. The process of claim 17, wherein the dilute phase zone typically has about 1% or less solid volume as that contained in the dense phase zone.

26. The process of claim 17, wherein, the dense phase zone has a solid volume content of from about 20% to about 40%.

27. The process of claim 17, wherein the dilute phase zone and dense phase zone located in a common vessel.

28. The process of claim 17, wherein the acoustic waveform is amplitude modulated, frequency modulated, or both amplitude and frequency modulated.

29. The process of claim 17, wherein the acoustic waveform is modulated in a frequency range of up to 1 GHz.

30. The process of claim 17, wherein the acoustic waveform is modulated in amplitude range of up to 200 dB referenced to 20 micro-Pascals.

31. The process of claim 17, wherein the acoustic waveform is applied as a standing waveform.

32. The process of claim 17, wherein the agglomerated particles are removed using a disengaging unit.

33. A process for separating catalyst particles from hydrocarbon, comprising:
flowing a hydrocarbon feed gas through a fluidized catalyst bed to convert the feed gas to hydrocarbon product, the bed comprising catalyst particles having a particle size distribution such that not greater than about 20 wt % of the catalyst particles in the bed have an average diameter less than or equal to 20 μm;
flowing the hydrocarbon product containing at least a portion of smaller solid catalyst particles through a dilute phase zone having a catalyst density less than that of the fluidized catalyst bed;
contacting the catalyst particles in the dilute phase zone with an acoustic waveform to agglomerate at least a portion of the catalyst particles; and
flowing at least a portion of the agglomerated catalyst particles and hydrocarbon product to one or more cyclones to separate at least a portion of the agglomerated particles from the gas.

34. The process of claim 33, wherein the gas is a hydrocarbon or regeneration medium.

35. The process of claim 33, wherein the catalyst particles are molecular sieve catalyst particles.

36. The process of claim 33, wherein the catalyst particles have an ARI of not greater than 5 wt %/hr.

37. The process of claim 33, wherein the dilute phase zone has a particle density less than that of the dense phase zone.

38. The process of claim 33, wherein the catalyst particles have a particle size in which not greater than about 20 wt % of the catalyst particles in the dense phase zone have an average diameter greater than or equal to about 250 μm.

39. The process of claim 33, wherein the catalyst particles in the dense phase zone have a particle size distribution in μm of $1<d_{10}<75$; $20<d_{50}<200$; and $50<d_{90}<400$.

40. The process of claim 33, wherein the dilute phase zone has a solid volume of from about 0.01% to about 15%.

41. The process of claim 33, wherein the dilute phase zone typically has about 1% or less solid volume as that contained in the dense phase zone.

42. The process of claim 33, wherein, the dense phase zone has a solid volume content of from about 20% to about 40%.

43. The process of claim 33, wherein the dilute phase zone and dense phase zone located in a common vessel.

44. The process of claim 33, wherein the acoustic waveform is amplitude modulated, frequency modulated, or both amplitude and frequency modulated.

45. The process of claim 33, wherein the acoustic waveform is modulated in a frequency range of up to 1 GHz.

46. The process of claim 33, wherein the acoustic waveform is modulated in amplitude range of up to 200 dB referenced to 20 micro-Pascals.

47. The process of claim 33, wherein the acoustic waveform is applied as a standing waveform.

48. The process of claim 33, wherein the agglomerated particles are removed using a disengaging unit.

* * * * *